US010679060B2

(12) United States Patent
Mietke

(10) Patent No.: US 10,679,060 B2
(45) Date of Patent: Jun. 9, 2020

(54) AUTOMATIC GENERATION OF USER INTERFACES USING IMAGE RECOGNITION

(71) Applicant: SAP SE, Walldorf (DE)

(72) Inventor: Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 16/140,554

(22) Filed: Sep. 25, 2018

(65) Prior Publication Data
US 2020/0097725 A1 Mar. 26, 2020

(51) Int. Cl.
*G06N 3/02* (2006.01)
*G06K 9/00* (2006.01)
*G06F 3/0481* (2013.01)

(52) U.S. Cl.
CPC ..... *G06K 9/00671* (2013.01); *G06F 3/04815* (2013.01); *G06K 9/00201* (2013.01); *G06N 3/02* (2013.01)

(58) Field of Classification Search
CPC combination set(s) only.
See application file for complete search history.

(56) References Cited

U.S. PATENT DOCUMENTS

| 7,762,459 | B2 | 7/2010 | Haller |
| 8,370,751 | B2 | 2/2013 | Graeff et al. |
| 8,775,934 | B2 | 7/2014 | Nasle et al. |
| 9,690,877 | B1 | 6/2017 | Lavian et al. |
| 2017/0052688 | A1 | 2/2017 | Evans et al. |
| 2017/0220236 | A1 | 8/2017 | Kwon |
| 2018/0053114 | A1* | 2/2018 | Adjaoute ............... G06N 7/005 |
| 2018/0060514 | A1 | 3/2018 | Mietke |
| 2018/0096108 | A1 | 4/2018 | Chkoundali et al. |
| 2018/0130114 | A1* | 5/2018 | Hawkins ............... G06Q 50/01 |
| 2018/0189331 | A1 | 7/2018 | Fabijancic et al. |
| 2018/0203891 | A1 | 7/2018 | Mietke et al. |

(Continued)

OTHER PUBLICATIONS

Bayle, Olivier, "Building—Architecture—Creating a 3D model from photos," retrieved from https://knowledge.autodesk.com/search-result/caas/simplecontent/content/buildingconstructioninfrastructure-E2-80-94creating-3d-model-photos.html, on or before Sep. 2018, 5 pages.

(Continued)

*Primary Examiner* — Tsung Yin Tsai
(74) *Attorney, Agent, or Firm* — Klarquist Sparkman, LLP

(57) ABSTRACT

Techniques and solutions are described for improving automated user interface generation. Devices can automatically be recognized in one or more images of a system or environment. At least certain devices can be identified as standard devices, and associated with device profiles. The device profiles can include information useable to identify user interface controls that should be rendered on a user interface for the system or environment. The user interface controls can be rendered over an image or schematic diagram of the system or environment, including at locations that correspond to a geospatial location of the corresponding device, or a controllable element thereof. The user interface controls can be associated with commands of a standardized command schema, which in turn are mapped to specific commands that can be sent to control the devices or controllable elements thereof.

20 Claims, 10 Drawing Sheets

(56) References Cited

U.S. PATENT DOCUMENTS

2018/0239802 A1    8/2018    Fabijancic et al.

OTHER PUBLICATIONS

"Capturing reality with automatic 3D photogrammetry software," retrieved from https://www.acute3d.com/, on or before Sep. 2018, 2 pages.
"What software is recommended to convert my pic to line drawing?" retrieved from http://www.wetcanvas.com/forums/showthread.php?t=1338836, on or before Sep. 2018, 7 pages.
Correa, Zach, "Turning a Picture into a 3D Model: Convert Photos to 3D," retrieved from https://www.sculpteo.com/blog/2016/01/20/turning-a-picture-into-a-3d-model, on or before Sep. 2018, 10 pages.

* cited by examiner

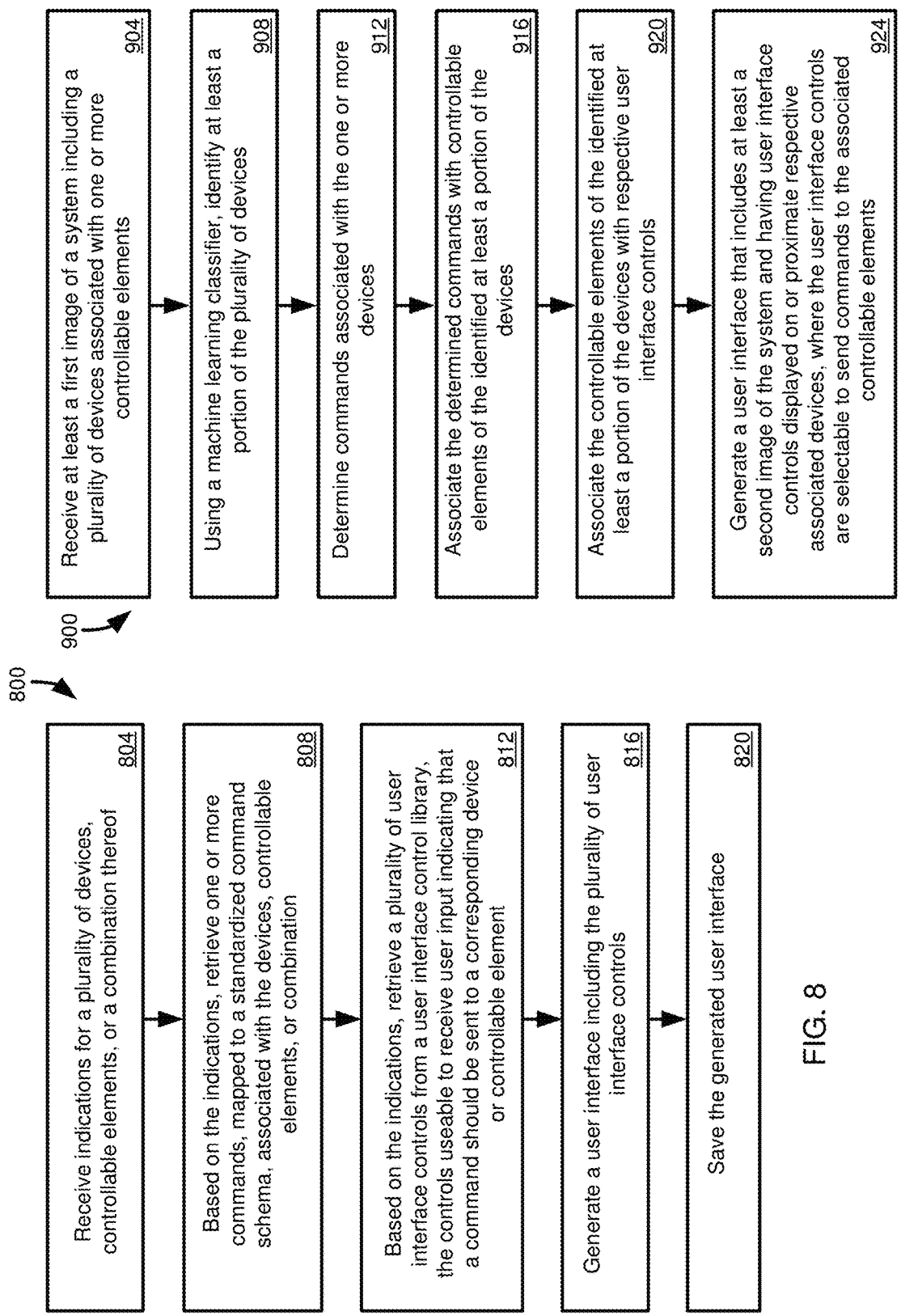

US 10,679,060 B2

AUTOMATIC GENERATION OF USER INTERFACES USING IMAGE RECOGNITION

FIELD

The present disclosure generally relates to the generation of user interfaces. Particular implementations relate to automatically generating user interfaces for systems or environments that include one or more standardized devices.

BACKGROUND

Software development can be complex, time consuming, and resource intensive. Even when frameworks, services, or libraries are available for certain software functionality, custom user interfaces are typically created. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for improving automated user interface generation. Devices can automatically be recognized in one or more images of a system or environment. At least certain devices can be identified as standard devices, and associated with device profiles. The device profiles can include information useable to identify user interface controls that should be rendered on a user interface for the system or environment. The user interface controls can be rendered over an image or schematic diagram of the system or environment, including at locations that correspond to a geospatial location of the corresponding device, or to a controllable element thereof. The user interface controls can be associated with commands of a standardized command schema, which in turn are mapped to specific commands that can be sent to control the devices or controllable elements thereof.

In one embodiment, a method is provided for generating a user interface. At least a first image of a system or environment that includes one or more devices is received. A machine learning technique is used to automatically recognize at least a portion of the one or more devices in the at least a first image. At least a portion of the one or more devices are associated with device identifiers, where a device identifier uniquely identifies a device. Standard devices of the at least a portion of the one or more devices are determined. The standard devices are associated with standard device identifiers (which, for example, identify a particular type or class of standard device, and the device identifiers can be used, among other things, to distinguish between multiple devices of a standard type that might be present in the system or environment).

Profiles associated with the standard device identifiers are retrieved. From the profiles, a plurality of controllable elements associated with the standard devices are determined. The plurality of controllable elements are associated with a plurality of user interface controls. At least a portion of the plurality of user interface controls are associated with commands for respective controllable elements of the respective standard devices. A user interface is generated that includes the plurality of user interface controls. The generated user interface is stored.

In a further aspect, a method is provided for generating a user interface that includes receiving indications for a plurality of devices, a plurality of controllable elements, or a combination thereof. Based on the indications, one or more commands associated with the plurality of devices, plurality of controllable elements, or combination thereof, are retrieved. The one or more commands are mapped to commands of a standardized command schema. Based on the indications, a plurality of user interface controls are retrieved from a user interface control library. At least a portion of the user interface controls are usable to receive user input indicating that a command should be sent to a corresponding device or controllable element. A user interface is generated comprising the plurality of user interface controls. The generated user interface is stored.

In another aspect, a method of generating a user interface includes receiving at least a first image of a system that includes a plurality of devices. Each device is associated with one or more controllable elements. Using a machine learning classifier, at least a portion of the plurality of devices are identified. Commands associated with the one or more devices are determined. The determined commands are associated with controllable elements of the identified at least a portion of the devices. The controllable elements of the identified at least a portion of the devices are associated with respective user interface controls. A user interface is generated that includes at least a second image of the system, which can be the first image. The user interface has user interface controls displayed on or proximate respective associated devices of the plurality of devices. The user interface controls are selectable to send commands to the associated controllable elements.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 7-9 are flowcharts illustrating example operations for generating user interfaces according to disclosed embodiments.

DETAILED DESCRIPTION

Example 1—Overview

Figure 1:
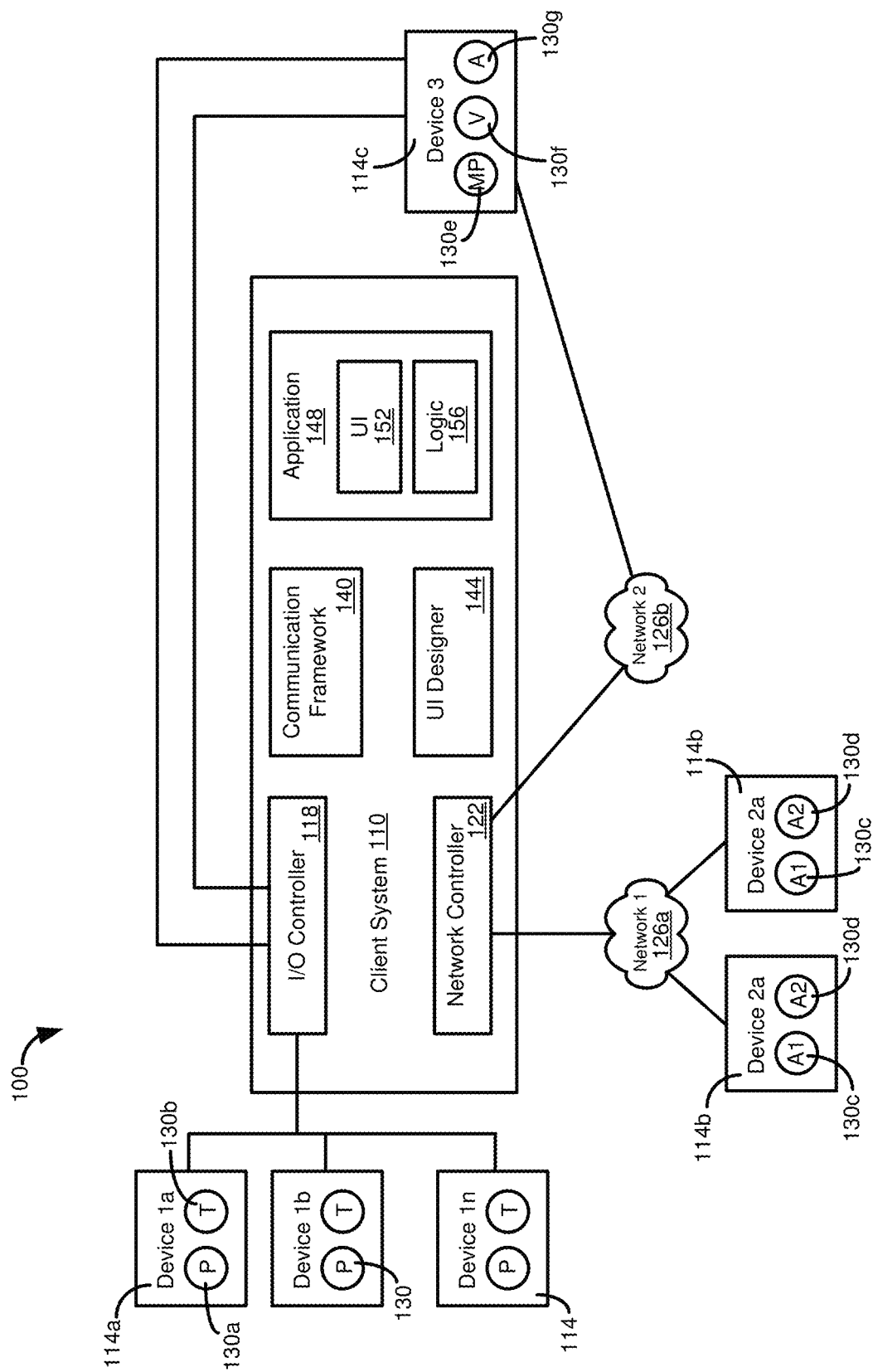
FIG. 1 is a block diagram illustrating a client system in communication with a plurality of devices, and having components for automatically generating a user interface that can be used to control the devices.

Software development can be complex, time consuming, and resource intensive. Even when frameworks, services, or libraries are available for certain software functionality, custom user interfaces are typically created. If the user interfaces are implemented in different manners, it can be more complicated for users to interact with software applications. For example, even if multiple software applications have similar functionality, a user may have to get used to various menus, icons, different placements of GUI elements, and workflows to accomplish various tasks. Accordingly, room for improvement exists.

In a specific example, applications are often developed for controlling, monitoring, or otherwise sending information or commands to, or receiving data from, various electrical, mechanical, or electromechanical devices that have computing functionality. These devices can include devices used in manufacturing processes or in research scenarios, such as scientific instruments that may be used in a laboratory or a research and development department.

Many of the devices may be at least partially standardized. For instance, operating theatres or other medical environments, may typically have many of the same types of devices, such as blood pressure monitors, heart rate monitors, oxygenation monitors, temperatures monitors, and the like. Similarly, laboratories in similar technological areas might include devices such as pumps, pressure monitors, temperature sensors, heating elements, cooling elements. With the advent of internet of things (IOT) devices, ever greater numbers and types of devices are becoming interconnected, increasing the generation of user interfaces, and potentially their complexity.

In some cases, devices that have similar functionality can be associated with different manufacturers, models, or versions. However, even when two devices are identical between two operating environments or use scenarios, the two operating environments or use scenarios may not be identical, including if multiple of the devices are included, but perhaps connected differently or used for different purposes, or if a particular environment includes another device, or device type, that is not included in the other environment. For example, twenty TOT devices can be interconnected in a wide variety of manners. Even though two environments may have the same number and type of devices, the interconnection of the devices, other the use case scenarios, may be such that a user interface for one is not suitable for use in the other.

Differences in the number and types of devices that may be included in a particular system or environment can result in a user interface design that may be suitable for a first system or environment not being suitable for a second system or environment. For example, if a first system includes two of device A, two of device B, and three of device C, as user interface may include elements that allow these different devices to be monitored and controlled, including possibly controlling the multiple devices of type A or type B individually, as a group, or both. A second system may include three of device A, five of device C, a device D, and a device E. Even though the first and second systems have devices A and C in common, each system includes a device type that is not present in the other. Even as to devices types A and C, the number of devices in each system differs. Thus, a user interface that is created for the first system will typically not be suitable to control the second system.

As discussed above, creating user interfaces can be time consuming. Continuing the example, even if the first system already exists, and has a user interface, that user interface would not typically be useable with the second system, at least not without potentially significant alteration. And the user interface for the first system may not be available in designing the user interface for the second system (e.g., the user interface for the first system may be unknown to someone developing the user interface for the second system, may be proprietary, etc.). Thus, a developer of a user interface for the second system will typically have to replicate a significant amount of work that was carried out in creating the user interface for the first system, despite what might be significant functional overlap.

Having user interfaces created for each system can also give rise to inconsistent user interface designs, even for portions of such designs dealing with common functionality. For example, functionality for device type A in the first system may be accessed through context menus, while functionality for device type A in the second system may be accessed through selectable icons (e.g., buttons). Even if a user is familiar with the operation of device type A, and the user interface of the first system, if that user then interacts with the user interface for the second system, it may take time for the user to understand how to access various features of device Type A in the second system. The user may need to become familiar with multiple user interface types, which can frustrate goals of security, performance, accessibility, globalization, and usability.

In various aspects, disclosed technologies can facilitate automated, or semi-automated development of user interfaces. An image of a system or environment can be obtained, which system or environment typically contains a plurality of devices having a plurality of device types. However, disclosed technologies may find use even when a plurality of a single type of device are used. Optionally, a full or partial list of devices used in the system or environment can be provided.

The images can be analyzed by an image-recognition service to determine devices (or components, including controllable elements of the devices) that are present in the system or environment. Many aspects of the disclosed technologies can be used with devices, controllable elements thereof (which are further defined below), or both. In some cases, the discussion may refer to both devices and controllable elements. However, for the sake of convenient presentation, in many instances the discussion may refer only to devices. However, it should be appreciated that, unless the technology or surrounding discussion indicate that a particular feature cannot be used with controllable elements, the feature should be understood as applying to devices, generally, or to individual controllable elements or multiple controllable elements of a device.

Recognized devices can be associated with a user interface definition. The user interface definition can include icons, context menus, other user interface elements or features, or combinations thereof, including user interface elements that can be used to control or otherwise communicate with recognized devices or controllable elements thereof. User interface controls can allow information to be retrieved from a device (including different types of information, or information in different formats), or to issue various commands to the devices.

In some cases, a user can be prompted to provide input to set up a device in a user interface, such as selecting a name for the device, selecting a communication protocol to be used, or setting other parameters or settings. Parameters or settings can be provided for the device, the user interface elements, or both. Similarly, a user can be prompted to create user interface elements for devices that were not recognized, such as custom devices. A user can be provided with options, including suggested options, for creating user interface features associated with an unrecognized devices, such as being provided with a library of available icons, device type categories, device functions, connection types, communication protocols, and the like.

In some cases, the user interface elements can be placed on a graphical user interface that includes a representation of the system or environment, such as an image, schematic drawing, or sketch of the system. In various aspects, the user interface elements can be placed automatically, manually, or a combination of manual and automatic placement. The image can provide geospatial information with respect to the system or environment, and can be used to establish relative locations of various devices, controllable elements, or other functionality. As an example, if a system includes two of device type A, user interface controls, or other visual information to distinguish the devices (e.g., labels in the image, which can be correlated with labels elsewhere in the GUI where device functionality can be accessed) can be provided to differentiate the first instance of the device type (e.g., located at the top of a system) from another instance of the device type (e.g. located at the bottom of the system).

Each instance of the device type can be provided with a separate user interface control, in some cases, and be positioned on the GUI at a location on the representation that corresponds with the analog-world location of the device on the system. Similarly, a label or identifier can be placed on the representation at a location corresponding to an analog-world location of the device in the system or environment. In other cases, the representation may be provided to a user to assist the user in understanding the available user interface elements, but the user interface elements, or labels, are not placed on the representation.

In at least some cases, a communication framework can be provided, and can be integrated with the user interface. For example, the communication framework can map user (or application) commands to retrieve information from, or send information (including commands) to a device. Or, the user interface can supply function stubs or API calls that a developer can use to add or alter device functionality, including to modify standard functionality or add custom functionality. That is, a developer can supply a method for the function stub or API call to implement functionality associated with device functionality, which in turn can be mapped to a user interface control.

The disclosed technologies can provide various advantages. By proving an automated or semi-automated user interface design tool, the time, effort and resources needed to create a user interface design can be reduced. The use of common user interface controls and other frameworks or components, such as communication components, can also reduce computing system complexity, as well as computing resource use (e.g., reducing the amount of code and data that is stored to achieve particular functionality). By maintaining a common user interface "look and feel," the usability of user interfaces can be improved, as a user familiar with a first user interface may find it more intuitive to interact with other user interfaces created using the disclosed technologies, as opposed to an arbitrary user interface created in another manner.

Example 2—Example System or Environment with Devices, Controllable Elements, and User Interface Generation Components FIG. 1 is a block diagram illustrating a scenario 100, according to an embodiment of the disclosed technologies, of how a client system 110 may interact with a plurality of devices 114. The client system 110 can include an input-output (I/O) controller 118, which can send data to, and receive data from, various types of devices using various protocols. In some cases, a device 114 can be connected to the I/O controller 118 using one or more input pins, one or more output pins, or a combination thereof. In other cases, the I/O controller 118 can be connected to a device 114 through another type of communication protocol, such as serial or parallel communication protocols, including USB, RS-232, or other types of protocols.

Client system 110 may also include a network controller 122, which can be connected to one or more networks 126. A network 126 can be of various types, such as a personal area network, a local area network, a wireless local area network, a wide area network, a storage-area network, an enterprise network, or a virtual private network. A network 126 can be limited to a particular set of computing devices, or can provide broader connectivity, such as providing a connection to the Internet.

A network 126 can be connected the network controller 122 using one or more protocols, including one or more protocols for data routing (e.g., IP) or transport (e.g., TCP or UDP), or for handling lower level functions of a network protocol stack (e.g., link, or physical layer). In at least some cases, the network controller 122 is capable of communication with multiple networks 126, using the same or different protocols, or the client system 110 can include multiple network controllers, for handling different functions, which can be represented for the sake of convenience as the single network controller 122.

In FIG. 1, three types of devices 114 are shown connected to the client system 110. It should be appreciated the scenario of FIG. 1 is to aid a discussion of the disclosed technologies, and in practice more or fewer types of devices 114 could be used, and more or fewer devices of each type could be present, including having a single device of a particular type. FIG. 1 includes multiple instances, a-n, of a first device type 114a. The first device type 114a includes two controllable elements 130, a pressure sensor 130a and a temperature sensor 130b.

As used herein, a controllable element 130 refers to a uniquely addressable element to which data can be sent, or from which data can be received. Controllable elements 130 for a particular device can be integrated into a common physical structure, or can be part of physically distinct structures. In some cases, a controllable element 130 can be a directly controllable element, such that commands can be directly sent to, or data directly received from, the controllable element. In other cases, a controllable element 130 can be an indirectly controllable element, where data is not directly received from, or directly sent to, the controllable element. For example, for a device 114 that includes a more general purpose microprocessor or integrated circuit that retrieves data from a controllable element 130, including upon request, and sends the data to the client system 110, the associated controllable elements may be considered indirectly controllable elements. In at least some cases, a controllable element is indirectly controllable if data transfer (i.e., sending or receiving) is mediated by a component that also mediates data transfer for another controllable element.

The controllable elements 130a, 130b are in communication (directly or indirectly) with the I/O controller 118. In contrast, the scenario 100 also illustrates two instances of a second device type 114b, each having controllable elements A1, 130c, and A2, 130d. Controllable elements A1 and A2 can represent, for example, actuators associated with respective devices 114b. The controllable elements 130c, 130d are connected, directly or indirectly, to the client system 110 through a first network 126a.

As discussed in Example 1, in some cases, devices 114 can be standardized devices, or devices otherwise having standardized or common functionality, including have common controllable elements. In other cases, devices 114 can be custom, or non-standard devices, which can include standard devices which have been modified such they are no longer the same as, or sufficiently similar to, a standardized device, or can be represent custom built or programmed devices (which, in turn could include one or more standard devices or controllable elements, one or more custom devices or controllable elements, or a combination thereof).

The device 114c is provided as an example of a custom device. The device 114c includes controllable elements 130e, 130f, 130g. Controllable element 130e is shown as in communication with the network controller 122 through a second network 126b. Controllable elements 130f, 130g are shown as connected to the I/O controller 118, including through two different communication channels (whereas the devices 114a are connected through the same communication channel).

The client device 110 includes components that can implement aspects of the disclosed technologies, including a communication framework 140 and a user interface designer 144. The user interface designer 144 can be used to create a user interface 152 for an application 148, such as an application that includes features for controlling the devices 114, and optionally for analyzing or processing data received from the devices. The user interface 152 can include features for presenting data to a user, and for receiving user commands to take action with respect to a device (which action could be to monitor data from the device).

User commands through the user interface 152 can be processed by a logic component 156 of the application 148. The logic component 156 can include functionality to access the communication framework 140, such as to register the application 148 with the communication framework, to register devices 114 with the framework 140, and optionally the application 148, and to call various functionality of the communication framework 140. In some cases, the communication framework 140 is omitted, and the devices 114 and the application 148 communicate directly, or another component mediates communications between the devices and the application.

Example 3—Example Computing Environment

Figure 2:
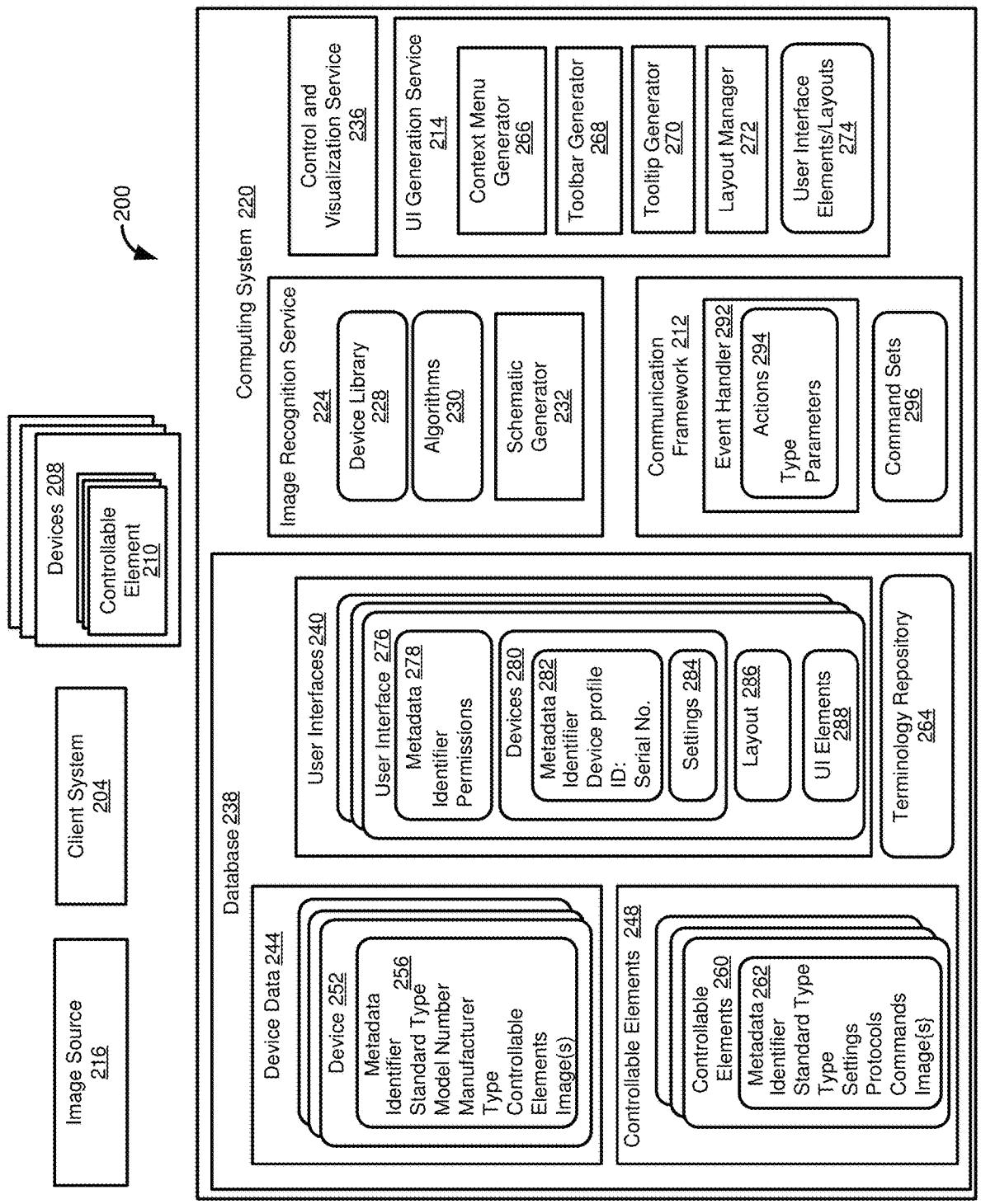
FIG. 2 is a schematic diagram of a computing environment in which disclosed technologies can be implemented.

FIG. 2 illustrates a computing environment 200 in which disclosed technologies can be implemented. The computing environment can include features described in the scenario 100 of FIG. 1, including a client system 204, a plurality of devices 208, which can have one or more controllable elements 210, a communication framework 212, and a user interface generation service 214, which can correspond to the components 110, 114, 130, 140, 144, respectively, of FIG. 1.

The computing environment 200 includes an image source 216, such as a camera, which can be a camera in a mobile device, such as a smartphone or tablet computer, a camera included in a drone, a digital SLR camera, or another type of camera or video recording device. The image source 216 can be used to obtain images of the devices 208, and optionally of a system or environment that includes the devices (which can be used, for example, to depict relative positions of the devices in the system or environment). The image source 216 can be in communication with an image recognition service 224, which can be included in a computing system 220.

The image recognition service 224 can include, or can access, a device library 228. The device library 228 can include one or more reference images for each of a plurality of devices. The image recognition service 224 can employ one or more algorithms 230 to attempt to identify devices, or controllable elements thereof, in images provided by the image source 216 (or another source). Any suitable algorithm can be used by the image recognition service, including algorithms that detect objects or which attempt to classify or label detected objects. Suitable image recognition services or algorithms include those incorporated into commercial products, including TENSORFLOW (Google, Inc., Mountain View, Calif.), DeepFace (Facebook, Inc., Menlo Park, Calif.), Project Oxford (Microsoft Corp., Redmond, Wash.), Google Cloud Vision (Google Inc., Mountain View, Calif.), Clarifai (Clarifai, Inc., San Francisco, Calif.), Imagga (Imagga, Sofia, Bulgaria). In general, suitable algorithms include deep learning/neural networks (including convolution neural networks), nearest neighbor classifiers, Bayesian classifiers, hidden Markov models, principle components analysis, scale-invariant feature transform, speeded-up robust features, linear discriminant analysis, and self-organizing maps.

A machine learning algorithm 230 is trained prior to use. Training can include manual training, such as submitting one or more images and an identifier for each of a plurality of devices 208 or controllable elements. In this way a classifier can be trained to correlate an image with the corresponding identifier. In particular aspects, all or a portion of the training can be automated. Provided with a device identifier (e.g., a particular model number, manufacturer, etc.), image libraries, such as an online image repository, can be queried using the device identifier, and returned images can be used to train the machine learning algorithm. Similarly, web crawlers can be used to obtain images for various devices or controllable elements. User or technical manuals and similar materials can also include images that can be used for classifier training. For custom devices 208, a list of controllable elements 210 or other components used in the device can be provided, which can assist in training, and in locating images that might be suitable for automatic training.

In some cases, a full or partial list of devices or controllable elements can be provided to assist the image recognition service 224, in particular the algorithms 230. In this way, the image recognition service 224 may be able to more quickly or confidently identify particular devices or controllable elements in an image. However, the use of the image recognition service 224 can still be beneficial in this scenario compared with completely manual setup of a system or environment, as the image recognition service 224 can associate particular components with particular geospatial information, which may be more time consuming if done manually, as well as potentially requiring more technical expertise.

In this regard, the image recognition service 224 can include a schematic generator 232. The schematic generator 232 can generate an image, such as a sketch, of a particular system or environment that includes a plurality of devices 208 or controllable elements 210. In particular cases, the schematic generator 232 produces a simplified image of a particular system or environment. That is, the relative location of devices and controllable components, as well as their absolute location (which can be approximate), may be helpful for a user, but a user typically need not be presented with a detailed image in order to interact with devices 208 and controllable elements 210, and providing a schematic diagram can help a user focus on the controllable elements. In other cases, a schematic diagram or other image can be manually supplied (including an image or diagram creating or modified using CAD design tools or other image creation or manipulation software).

One or more images from the image source 216 may be used to produce a two-dimensional or three-dimension representation of a system or environment. In some cases, three-dimensional representations can be created, but a two-dimensional projection (or multiple such projections) can be used in a final user interface. Various commercial products exist for creating three-dimensional representations from images, including creating three-dimensional mesh objects that can be processed to provide simplified schematic diagrams, including being processed to provide two-dimensional projections. Such products include AUTODESK® of Autodesk, Inc., of San Rafael, Calif. Other suitable techniques include those useable in 3D printing applications, including Acute 3D (Bentley Systems, Inc., of Sophia Antipolis, France). The image recognition service 224 can use image recognition and classification results, such as from the algorithms 230, to locate and identify particular devices 208 or controllable elements 210 on a schematic diagram or other image produced by the schematic generator 232 (or obtained from another source).

The image recognition service 224 can be in communication with, and responsive to, a control and visualization service 236. The control and visualization service 236 can coordinate activities of components of the computing system 200, including requesting or receiving image data from the image source 216, providing image data to the image recognition service 224, receiving a list of identified devices 208 or controllable elements 210 (which lists can include geospatial information), receiving a schematic diagram or other image of a system or environment from the image recognition service 224, retrieving and mapping commands, and processing data received from, or sent to, a device or controllable element, using the communication framework 212, causing the generation of a user interface using the user interface generation service 214, or combinations thereof.

The control and visualization service 236 can determine commands associated with devices 208 or controllable elements 210. In some cases, the control and visualization service 236 can determine controllable elements 210 associated with a particular device 208. In determining commands and controllable elements 210 the control and visualization service 236 can access a database 238. The database 238 can store various types of information, including various types of information useable by the control and visualization service 236. In particular the database 238 can include device data 244 and controllable element data 248.

The device data 244 can include metadata profiles 256 for a plurality of devices 252. The metadata profiles 256 can include information describing a device 252, including an identifier of the device (which can be a name, such as a human readable name, or another unique identifier of a specific device), an identifier for a standardized device type, a model number of the device, a manufacturer of the device, a type of the device (e.g., actuator, temperature gauge, pump), identifiers for one or more controllable elements associated with the device, and, optionally, one or more images. However, a metadata profile 256 can include more, less, or different information than shown and described. When image metadata is provided, the image metadata can include one or more images of the device, such as from different sides or angles. The image metadata can be used, in some cases, by the image recognition service 224. For example, the device library 228 may be, or may access, the device data 244 of the database 238.

The controllable element data 248 can include metadata profiles 262 for a plurality of controllable elements 260. In at least some cases, a controllable element 260 can be associated with multiple devices (although, in some cases, it can be customized for a particular device, for example based on particular properties of a particular device, such as available commands or device sensitivity or power). The metadata profiles 262 can include an identifier for the controllable element, which can be a human readable name or another unique identifier of a specific controllable element, an identifier for a standardized type associated with the controllable element (e.g., a transducer, motor, temperature sensor, etc.), settings associated with the controllable element (e.g., an operating frequency, a unit of measurement), protocols used with or by the controllable element (e.g., a communication protocol, such as a data transfer or networking protocol), one or more commands associated with the controllable element (e.g., set value for parameter X, get current temperature reading, move 5 degrees counterclockwise, delete cached readings, etc.), and, optionally, one or more images.

A metadata profile 262 for a controllable element 248 can include more, less, or different information than shown and described. When image metadata is provided, the image metadata can be used, in some cases, by the image recognition service 224. For example, the device library 228 may include, or access, the controllable element data 248, including to geospatially locate controllable elements on a device, including relative to other controllable elements of the device.

In some cases, when metadata profiles 256, 262 are created for a device 208 or controllable element 210, the device or controllable element can be converted to a common schema, such as a standardized command schema. For example, a device 208 may natively come with a command set that includes various functionalities to send data or commands to the device, or receive data from the device. Devices 208 or controllable elements 210 may have different names for the functionalities, such as "TURN_OFF", "OFF", "SWITCH_OFF." In creating a metadata profile 256, 262, functionalities can be mapped to the common schema, such as having all of the three options for "power off" being mapped to "DEVICE_OFF."

Thus, a user interface created using the disclosed technologies can present a user with common terminology and user interface presentation, which can assist a user in understanding and using the user interface, reducing any learning curve associated with using a device with which the user is not familiar. The mapping can "translate" from the command provided through the user interface to the command to be sent to the device 208 or controllable element 210 to execute a particular function. For example, if the user calls a "DEVICE_OFF" function, the mapping can determine that a particular device 208 should have its "SWITCH_OFF" method called. Mappings between individual device commands and the standardized schema are further described in Example 4, below.

To help map devices 208 and controllable elements 210 to a schema, the database 238 can include a terminology repository or dictionary 264 that can be used to map schema elements to device functions. For example, the terminology repository 264 can list "DEVICE_OFF" as a synonym for "OFF." Thus, the terminology repository 264 can also function as a rule set that can be used to map device or controllable component terminology to a common schema.

In some cases, the functions associated with a device 208 or controllable element 210 can be manually determined and entered into a metadata profile 256, 262, such as in a registration step. In such case, a user can be provided with schema information to help the user map particular device functions to particular schema elements. In other cases, a device 208 or controllable element 210 can be added to a metadata profile 256, 262 in an automated manner, such as by analyzing a user manual or other technical information, by analyzing code associated with the device or controllable element (which can be code located on the device or controllable element or remote software, such as software for controlling a device from a desktop, laptop, or mobile computing device), or by intercepting commands for the device (for example, the user presses an "off" button, and a software component, such as the control and visualization service 236, or a component in communication with the control and visualization service, intercepts a signal that causes the device to power off).

A list of identified devices 208 or controllable elements 210, optionally with geospatial information, or a schematic diagram, can be provided by the image recognition service 224 to the control and visualization service 236. That is, during image processing by an algorithm 230, the algorithm, or another component, can associate a particular position in the system or environment with a device 208 or controllable element 210, even if the device or controllable element could not be specifically identified (for example, the device is a custom device, or a model for which the algorithm has not been trained). The control and visualization service 236 can provide a list of devices 208, controllable elements 210, and commands associated with the controllable elements to the user interface generation service 214. The user interface generation service 214 maps devices 208, controllable elements 210, and commands of the controllable elements to user interface controls or to other user interface elements (e.g., fields that display information about available devices, controllable elements, and commands, but which are not selectable to carry out particular actions).

The user interface generation service 214 can include a variety of components for use in constructing a user interface, including a context menu generator 266, a toolbar generator 268, and a tooltip generator (or short text service) 270. The user interface generation service 214 can also include a layout manager 272. In constructing a user interface, the user interface generation service 214, including the components 266, 268, 270, 272 can access a library 274 of user interface elements and layouts.

User interface elements in the library 274 can include standard user interface elements, such as menus, buttons, icons, and the like for constructing a user interface, including user interface elements that have been provided for standard device 208 or controllable element 210 types or functionality. For example, a variety of devices 208 or controllable elements 210 may be associated with pressure monitoring, and so standard user interface elements, such as context menus, button, or icons, can be provided for pressure monitoring functionality. Although the user interface elements in the library 274 are referred to as "standardized," such elements may be customized to varying degrees, including based on how a particular device 208 or controllable element 210 might operate, features that may or may not be available on a particular device 208 or controllable element 210, etc.

Layouts of the library 274 can be used by the layout manager 272 to produce a particular user interface. For example, a layout can specify locations of a toolbar, other user interface icons, context menu formatting, and other user interface features. In some cases, different layouts (or user interface elements, including commands made available), can be selected based on particular devices 208 or controllable elements 210 that are included in a system or environment, or a general technical area. For instance, a research and development unit may prefer a different user interface than a production manufacturing unit, or a research and development unit in chemistry might prefer a different layout than a research and development unit in physics or electrical engineering. Rather than being automatically determined, a user can be queried for a technical area, which can then be used to determine a layout or other aspects of a user interface.

The context menu generator 266 can format commands for a particular device 208 or controllable element 210 into a context menu. In some cases, a context menu can be provided for a device 208, with elements of an initial menu corresponding to controllable elements 210 associated with the device. By selecting a controllable element 210, a submenu can display commands available for the controllable elements. Depending on the number of commands and complexity, further submenus can be provided (e.g., a "power" user interface control can be selected to display a submenu that provides options of "on," "off," "reset," and "sleep").

The toolbar generator 268 can be used to generate a toolbar with one or more icons or selectable elements. In some cases, the toolbar generator 268 can provide multiple toolbars, or can provide user-selectable user interface elements that are not associated (at least visually) with a toolbar. A toolbar can include standard features, such as to change a user, add or remove devices 208 or controllable elements 210 to or from a user interface, to add or remove device or controllable element types, to perform or schedule maintenance for a system or environment (including for individual devices or controllable elements of the system or environment), and to toggle the display of certain information, such as a schematic diagram or image of a system or environment, log information, or graphs of system information.

The toolbar generator 268 can also provide buttons or other user interface elements, or entire toolbars, which are specific to a technical field, use case scenario, device 208, or controllable element 210. For example, a research scenario might have a "setup experiment" toolbar or button, while a production environment may have a "configure product production run" toolbar or button. Engineering applications may have toolbars for "hydraulics" or "pneumatics" system, while a chemical application may have toolbars for "reaction product analysis" or "reaction monitoring."

In at least some aspects, elements of a user interface (including layouts, buttons, toolbars, other user interface elements, and the like) can be determined or suggested based on devices 208 or controllable elements 210 included in a system or environment, including those determined by the image recognition service 224. For instance, the presence of a rotary evaporator as a device 208 may suggest that the system or environment is associated with the chemical arts, in turn suggesting particular layouts, content menus, toolbars, buttons, and other user interface elements that may or will be used in a particular user interface.

The tooltip generator 270 can provide help text or other explanatory text to be associated with particular user interface elements. For example, the tooltip generator 270 can link help text with icons for particular devices 208 or controllable elements 210. If a user hovers over the icon, or makes another suitable pointing action, the help text can be displayed. Help text can include text identifying a particular device 208 or controllable element 210, identifying a type of a device or controllable element, explaining available actions with respect to a device or controllable element, and the like.

User interfaces produced by the user interface generation service 214 can be stored, including on the client system 204 or in the database 238. In particular, the database 238 is shown as containing user interface definitions 276. The user interface definitions 276 can include metadata 278 and device information 280. Metadata 278 can include an identifier associated with the user interface and permissions information, such as users or user classes or types that are allowed to access the particular user interface definition 276.

Device information 280 can include device metadata 282 and device settings 284 for devices 208 associated with a user interface. The device metadata 282 can include an identifier for the device 208 (e.g. a specific device), a device profile, which can reference a particular device profile 252, and optionally other identifying information, such as a serial number. Settings 284 for the particular device 208 associated with a user interface definition 276 can be included in the device information 280. In this way, devices 208 associated with a particular system or environment can be identified uniquely for the system or environment, but also correlated with a standard device type, which can specify commands and other information for the device type. In some cases, component metadata can be included for a user interface definition, and can be similar to the device information 280.

In at least some implementations, a user interface created using the user interface generation service 214 can receive data from a device 208 or controllable element 210, or send commands or other data to a device or controllable element, using the services of a communication framework 212. The communication framework 212 can include an event handler 292 that has rules for one or more actions 294, which can be actions associated with a particular device 208 or controllable component 210.

The actions 294 can include an action type, or identifier, and optionally one or more parameters. An action 294 can be created for data sent to a device 208 or controllable element 210, which can instruct a user interface (or an application that uses the user interface) what to do with the data, such as where or how the information should be displayed, or how the information should be stored or processed. Parameters can include variables or data objects to which data associated with an action 294 (e.g., data received from a device 208 or a controllable element 210) should be assigned, or values that are to be provided to a device or component.

The communication framework 212 can translate commands from a user interface into a command that can be accepted by a device 208 or controllable element 210, and can access a command set library 296. The command set library 296, in at least some cases, can also be accessed by, or be associated with, a device profile 252 or a controllable element profile 260. As explained above, commands and return values of a device 208 or controllable element 210 can be mapped to corresponding functions or variables associated with elements of a user interface.

Command sets can be maintained for particular types of devices 208 or controllable 210, which can be standard types (e.g., a particular brand and model of device) or a custom device for which a command set has been created and provided. Thus, the commands sets 296, can be, or can include, one or more standardized command schemas and mappings that associate commands for particular controllable elements 210 or devices 208 with commands of the standardized commands, where the standardized commands can be associated with particular user interface elements or controls.

The communication framework 212 may be used for other purposes. For example, the communication framework 212 can facilitate intercommunication by devices 208, controllable elements 210, or combinations thereof. That is, it may be desirable for a first device 208 to send commands, or other data, to another device. However, the devices 208 may not be natively able to communicate. The commands set library 296 can be used to map commands or communication protocols for a first device 208 to a second device.

Although many aspects of the computing environment 200 have been described as automated, at least certain aspects can also be manually performed, in whole or part, or the results of automated process can be adjusted using user feedback. For example, if an algorithm 230 fails to identify, or misidentifies, a device or controllable element, user feedback can provide a correct identification. Aspects of a user interface, including controls made available and their positions, can be manually adjusted, including adding, removing, or modifying controllable elements. If a user adds, removes, or modifies commands available in the user interface, an algorithm can be trained, or other indications stored, that can provide more accurate or helpful user interfaces in the future.

User input can also be used to define custom devices 208, controllable elements 210, or a combination thereof. A user can indicate a location of a custom object on an image, and user interface controls can be placed at the locations. A user can provide an identifier for the custom object and define a profile, which can include available commands and functionality, and can be mapped to a standardized command schema.

When an image is provided in a user interface, a user may be given the option, which can be during user interface creation, or during use of the user interface, to manipulate the image, such as rotating, zooming, or moving the image. The user may also be able to switch between images or viewpoints. In addition, although described as generally static images, an image used with a user interface can include video or virtual or augmented realty features. For instance, in a dynamic environment, such as an operating theatre, it may be useful to associate user interface elements with particular objects in a video image. User interface elements can move with the corresponding objects in the rendered user interface (e.g., the user interface controls move along with the object).

Example 4—Example Mapping of Commands to Standardized Schema

Figure 3:
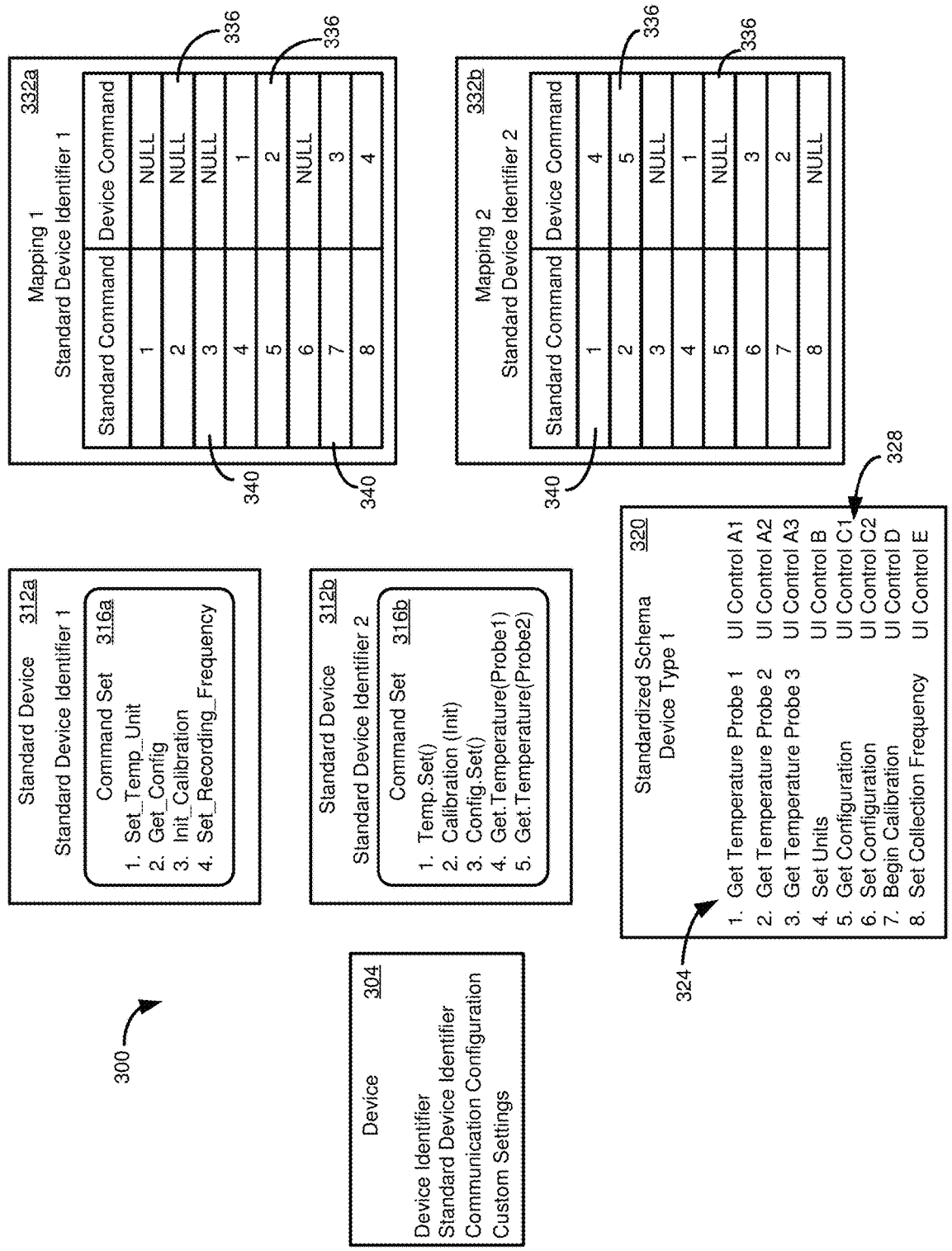
FIG. 3 is diagram illustrating how devices can be associated with standard device profiles, which in turn can be mapped to a standardized command schema.

FIG. 3 illustrates data structures 300 that can be used to associate a particular device or controllable component of a system or environment for which a user interface is being created with a particular type of standardized device, and how multiple standardized devices can be mapped to a common command schema. The data structures 300 can be part of the command sets 296 of FIG. 2.

A device profile 304 can be created for a particular device associated with the system or environment. The device profile 304 can include an identifier that uniquely identifies the device in that system or environment, and a standard device identifier that associates the unique device with a standardized device type (e.g., device 1234 in the system is a temperature regulator unit, model XY, from manufacturer Z). The device profile 304 can include communication configuration information, such as pin, port, IP address, MAC address or other information needed to communicate with the device. The device profile 304 can also include any custom settings for the unit.

Standardized devices profiles 312 can be provided for different types of devices, which can be devices that are mass produced or otherwise produced in multiple units having a common specification or configuration. Continuing the example above, temperature regulator units may be available from manufacture Z, and from manufacturer M. Manufacturer Z may sell a unit XY1 in addition to unit XY. Although the temperature regulators may serve a common function, they may different properties, including different ways of communicating information or receiving commands, different components or capabilities, and different methods (e.g., API calls, signals, etc.) commands that are used to send data or commands to, or receive data from, the devices. In particular, it can be seen that device profile 312a has a command set 316a that expresses commands in a different manner than command set 316b of device profile 312b, even though some of the commands may serve the same purpose (e.g., both device profiles 312a, 312b have a command to initiate a calibration routine, but the commands to start the routine are different between the two types of standardized devices). In can also be seen that the two commands sets 316a, 316b can include a different number of commands, and different commands.

A particular type, class, or category of devices can be associated with a standardized schema 320 that include a plurality of commands 324. For example, a standardized schema 320 can be created for the class of devices of "temperature regulators." Commands for different temperature regulator units or types can be mapped to the commands of the standardized schema 320. The commands 324 can in turn be mapped to particular user interface controls or elements 328, or other information useable to generate or operate a user interface.

The command sets 316b can be mapped to the standardized schema 320 through respective mappings 332a, 332b. The mappings 332a, 332b associate device commands 336 of the commands sets 316a, 316b with standard commands 340 of the standardized schema. It can be seen that a profile 312 for a particular standardized device need not have commands for every command 324 of the standardized schema 320, and the different standardized devices associated with the standardized schema 320 can have different degrees of overlap with the standardized schema.

Although this Example 4 primarily describes commands that are sent to a device or controllable element, the description can be adapted to address commands or other data received from a device or controllable element. For instance, the standardized command schema 320 can include rules for handling data received from a device or controllable element. Rules can define how a display, or a particular user interface element, should respond when data is provided. Updating a display can include updating a chart, graph, or other representation of data (such as measurements) received by a device or controllable element. Rules can also be set to generate alerts or take other actions in response to data received from a device or controllable element, including sending commands to one or more other devices or controllable elements.

Example 5—Example Component Interactions for User Interface Generation

Figure 4:
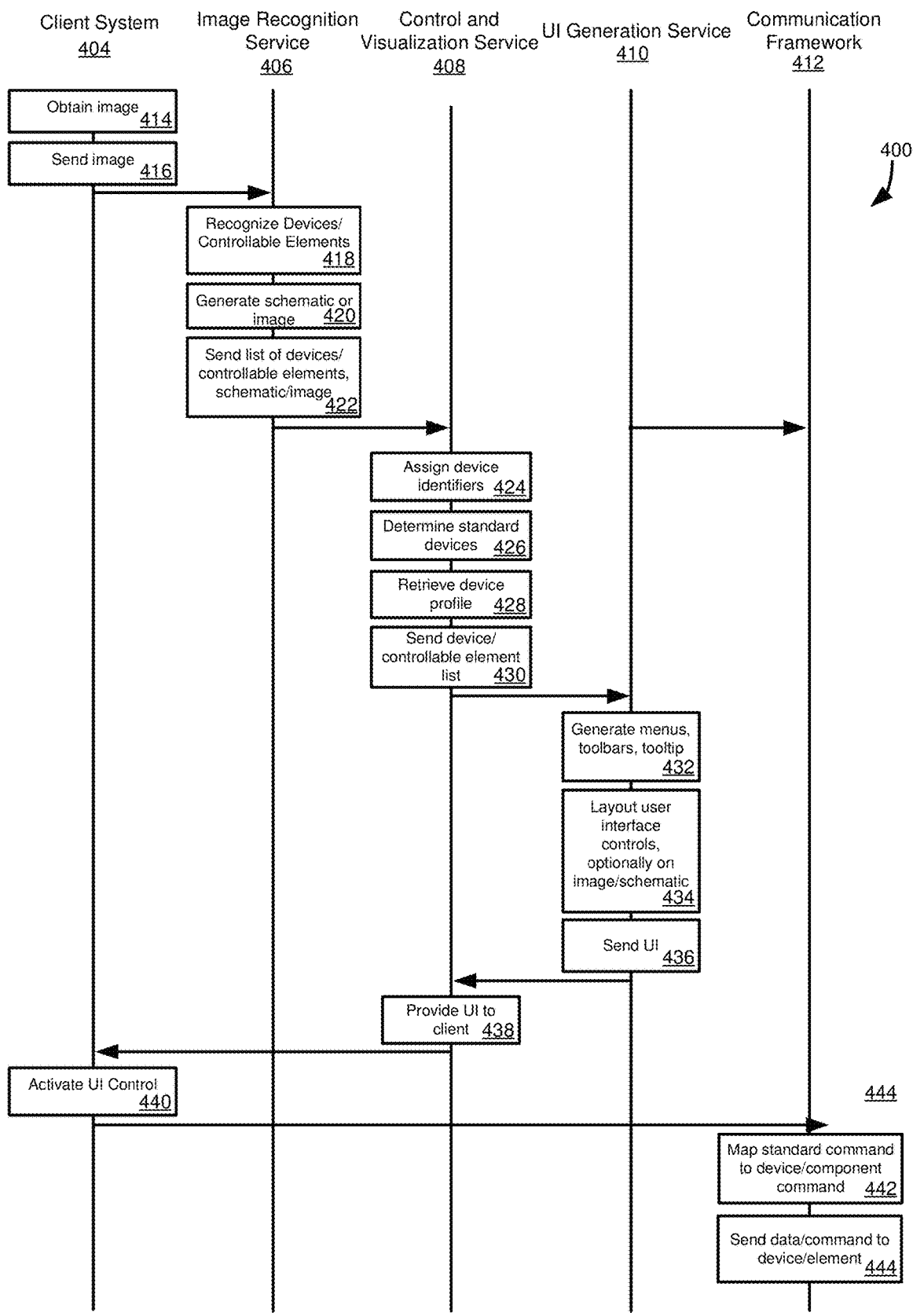
FIG. 4 is a timing diagram illustrating how components of FIG. 2 can interact in creating a user interface.

FIG. 4 illustrates operations 400 that allow components of the computing environment 200 of FIG. 2 to interact in order to generate and use a user interface according to an embodiment of the disclosed technologies. The operations 400 are described with respect to timelines for a client system 404, an image recognition service 406, a control and visualization service 408, a user interface generation service 410, and a communication framework 412, which components can be at least similar to the similarly titled components 204, 224, 236, 214, 212 of FIG. 2.

At 414, the client system 404 obtains one or more images of a system or environment for which a user interface is to be created. The images can be obtained from the image source 216 of FIG. 2. The image is sent from the client system 404 to the image recognition service 406 at 416. At 418, the image recognition service 406 recognizes devices, controllable elements, or a combination thereof, in the images from the client system 404. Optionally, at 420, the image recognition service generates a schematic or image for use in the user interface. At 422, the image recognition service 406 sends a list of devices, controllable elements, or a combination thereof, and optionally a schematic or image, to the control and visualization service 408.

The control and visualization service 408, at 424, assigns device identifiers to recognized devices (optionally, the service could also assign identifiers to controllable elements). The device identifiers uniquely identify devices in the system or environment. At 426, the control and visualization service 408 determines standard devices associated with the recognized devices, and assigns a standard device identifier to the devices. For example, 426 can include determining that a recognized device is a standard device sold by a particular vendor. Device profiles can be retrieved for the standard devices at 428. A list of controllable elements can be retrieved from the device profiles and sent, with a list of the devices, to the user interface generation service 410 at 430.

At 432, the user interface generation service 410 generates aspects of a user interface, including menus, toolbars, and tooltips. Use interface controls, and other user interface features, can be those associated with the particular controllable elements/devices sent at 430. At 434, the user interface generation service 410 creates a layout for the user interface, including positioning the user interface controls relative to one another. In at least some cases, the user interface controls can be placed over the schematic or image of the system or environment, including at locations that at least generally correspond to a geospatial location of the corresponding device or controllable element in the system or environment. The generated user interface is sent to the visualization service at 436, and from the visualization service to the client system 404 at 438.

At 440, a control of the user interface is activated, such as in response to user input. An indication of the activation is sent to the communication framework 412. The standard command associated with the user input is mapped to a device or component command at 442, such as using a standardized command schema in combination with a mapping. At 444, a command, or other data, is sent to the corresponding device or controllable element.

It should be appreciated that the operations 400 provide an example scenario, and changes may be made without departing from the scope of the present disclosure. In particular, certain steps, such as obtaining an image, can be omitted, or various functions described as being performed by one component can be performed in whole or part by another component, including components not described in FIG. 4.

Example 6—Example User Interface Screen

Figure 5:
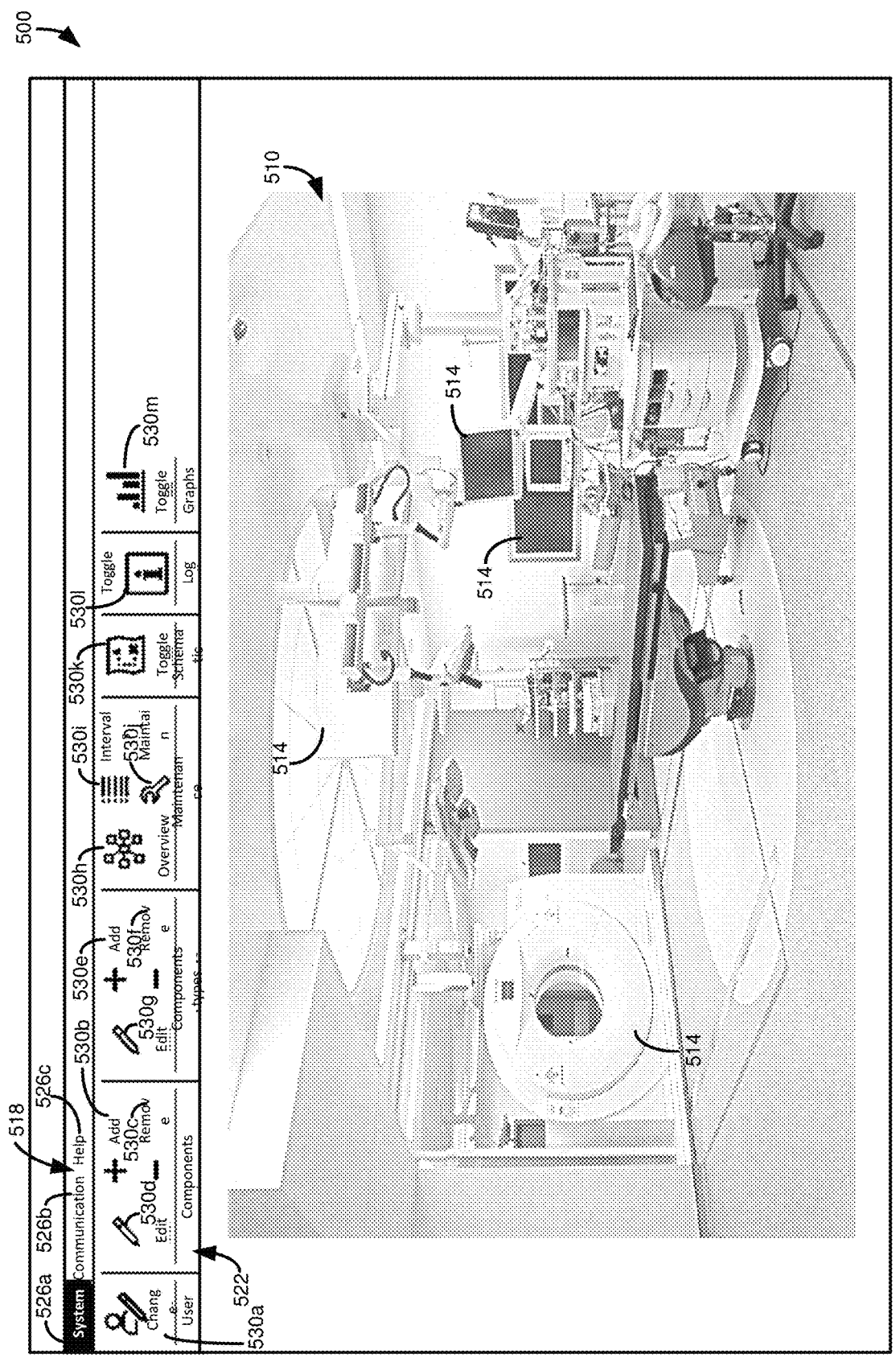
FIG. 5 is an example user interface screen having an image of a system or environment, prior to inserting user interface controls for devices or controllable elements of the system or environment.

FIG. 5 illustrates an example user interface screen 500. The user interface screen 500 can include an image 510 of a system or environment for which a user interface is being created. As shown, the user interface screen 500 does not yet include user interface elements for specific devices or controllable elements of the system or environment depicted in the image 510. However, it can be seen that the image 510 depicts a plurality of devices 514, each of which may be associated with one or more controllable elements.

The user interface screen 500 include a menu bar 518 and a toolbar 522. The menu bar 518 and the toolbar 522 can be standard user interface features, or at least features common to user interfaces for a particular application or technical area. The menu bar 518 can include tabs 526 for various views. For example, the system tab 526a is shown as selected, and corresponds to the screen 500. A user can select a communication tab 526b, which can present a user with a user interface screen that displays communication information associated with the system or environment, such as indications of which devices or controllable elements are directly connected to a computer device (e.g., on which the screen 500 is being rendered, or a device that collects data for the system or environment associated with screen 500) and which devices or controllable elements are connected over a network, and connection information (e.g., protocol, wired or wireless connections, security protocols, port information, and the like).

A help tab 526c can be selected to provide information to a user to assist in navigating the screen 500, or regarding the system or environment associated with the screen 500, including particular devices or controllable elements. For instance, user manuals or technical guides for devices or controllable elements can be accessed through the help tab 526c.

The toolbar 522 can include a variety of icons or buttons 530, including a button 530a that can be selected to change a current user. In at least some cases, a user identity or role can be tied to actions that are available to a user. For instance, some users may only be allowed to take an action from a defined set for a particular controllable element, but may not be allowed to set configuration settings for the controllable element.

Buttons 530b, 530c, 530d allow a user to edit, add, or remove, respectively, components (e.g. devices or controllable elements) from a system or environment currently associated with the screen 500, such as an system or environment depicted in the image 510. Similarly, buttons 530e, 530f, 530g can allow a user to edit, add, or remove, respectively, component types (e.g., device or controllable element types) from the system or environment currently associated with the screen 500. In a specific example, a user can add a new device or controllable element by selecting button 530c, and can then assign a type to the new device or controllable element. If a particular type has not been created for the new device or controllable element, it can be added by selecting button 530e.

Buttons 530h, 530i, 530j can be provided to allow a user to access various maintenance related functions. In particular, overview button 530h can present the user with a graph or similar view illustrating connections between devices or controllable elements and current status information (e.g., power status, such as on or off, communication status, such as a protocol or data transfer rate, the existence of error conditions or normal operation, etc.). An intervals button 530i can allow a user to set a schedule for when maintenance related information should be acquired, or maintenance related actions taken (e.g., to periodically reboot a device, execute a cleaning sequence, etc.). A maintenance button 530j can allow a user to take maintenance related actions with respect to one or more devices or controllable elements of the system or environment associated with the screen 500.

In some cases, a display may become difficult to interpret if too much information is presented at once. Accordingly, a toggle schematic button 530k can be provided, which can allow a user to selectively display the image 510, or a schematic diagram corresponding to the image 510. In some cases, log information associated with the system or environment, including log information associated with particular devices or controllable elements, can be displayed on the screen 500. A log display button 530l can be provided to allow a user to display or hide log information. Similarly, a graph display button 530m can allow a user to selectively display information graphs, such as graphs regarding performance parameters or quantities measured (or quantities calculated therefrom) by devices or controllable elements of the system or environment associated with the screen 500.

In some cases, the screen 500 is not provided. For instance, the image 510 can be used, without being included in a user interface screen, to create a schematic diagram that will be used with a user interface screen, such as the user interface screen 600 of FIG. 6, further described below. Or, a user interface screen need not include an image or a schematic diagram of a system or environment having devices and controllable elements to be controlled or monitored using the user interface.

Figure 6:
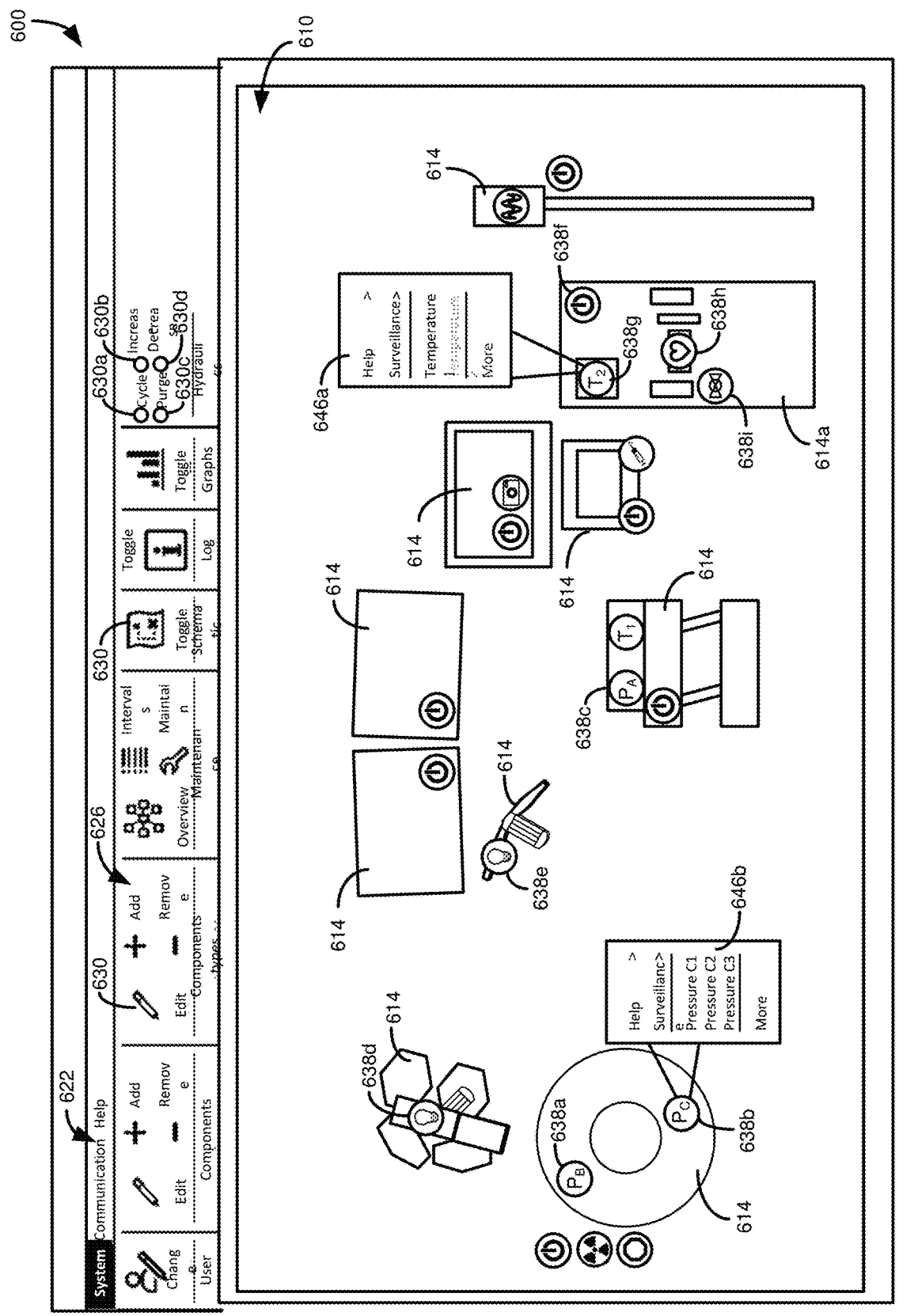
FIG. 6 is an example user interface screen having a schematic diagram of a system or environment, over which various user interface controls for devices or controllable elements have been rendered.

Example 7—Example User Interface Screen with Schematic Diagram and User Interface Controls for Devices or Controllable Elements FIG. 6 illustrates an example user interface screen 600. The user interface screen 600 can include a schematic diagram 610 of a system or environment associated with a user interface. In particular examples, the schematic diagram 610 is created, including in an automated manner, from an image provided by an image source, such as the image 510 of FIG. 5. In a particular embodiment, the schematic diagram 610 includes an outline of devices 614 of a system or environment associated with the user interface screen 600.

The devices 614 can be placed on the schematic diagram 610 at locations which convey their relative geospatial locations. Although not shown in FIG. 6, in some cases the schematic diagram 610 can depict controllable elements, including at positions in the schematic diagram consistent with their relative geospatial locations, and with respect to the devices 614.

The user interface screen 600 can include a menu bar 622 and a toolbar 626, which can be at least generally similar to the menu bar 518 and the toolbar 522 of FIG. 5, and comparable features and elements will not be described. The toolbar 626 includes a plurality of user interface elements 630, such as buttons. Compared with the toolbar 522 of FIG. 5, the toolbar 626 includes additional user interface elements 630*a*-630*d*, for a hydraulics category. The hydraulics category can represent a category that was provided by a specific layout chosen for the system or environment, including being chosen manually by a user or chosen or suggested automatically based on devices 614 and controllable elements automatically determined to be present in the system or environment.

The user interface screen 600 includes icons 638 for a plurality of controllable elements. As shown, a device 614 can include one or more controllable element icons 638. The controllable element icons 638 can be placed on the schematic diagram 610 at locations that correspond to a geospatial location of the corresponding controllable element in the system or environment associated with the user interface screen 600. In particular examples, at least a portion of the controllable element icons 638 are placed on the schematic diagram 610 at positions corresponding to a controllable element, such as the location of a physical button or switch. In other examples, such as when no switch or other activatable element exists, the controllable element icon 638 can be placed at a visually distinguishable location on the schematic diagram 610, which can be a location where the controllable element can be easy distinguished in the analog world system or environment, making it easy for a user to find controllable element icons 638 for particular functions.

The controllable element icons 638 can include an image, letter, number, other identifier, or a combination thereof, to help convey the function of a controllable element associated with an icon, or to distinguish between icons. For example, controllable element icons 638*a*, 638*b*, 638*c* all correspond to pressure sensors. The controllable elements icons 638*a*, 638*b*, 638*c* include labels, PA, PB, PC, to help a user distinguish between the icons. Controllable element icons 638*d*, 638*e* are associated with light switches, which meaning can be conveyed by using an image of a light bulb with the icons.

As explained above, the relative geospatial locations, and locations relative to the devices 614, of the controllable element icons 638 can help a user distinguish between them. For example, device 614*a* may have a power switch, a temperature sensor, an ECG monitor, and a flow valve, which can be associated with controllable element icons 638*f*, 638*g*, 638*h*, 638*i*, respectively. The controllable element icons 638*f*, 638*g*, 638*h*, 638*i* can be placed at locations on the schematic image of the device 614*a* that correspond to geospatial positions of corresponding device controls on the physical device 614*a*.

In some cases, the user may be able to take actions with respect to a controllable element icon 638 by making a first pointing action, such as left clicking, on the icon. A user may be able to take additional actions by taking other pointing actions. For instance, by right clicking on a controllable element icon 638, a user may bring up a context menu that can provide various commands or other options for a particular controllable element associated with the controllable element icon.

As an example, FIG. 6 shows a context menu 646*a* associated with controllable element icon 638*g*. Controllable element icon 638*b* is for a pressure sensor, and the context menu 646*b* displays three pressure sensors elements, C1 to C3, that are associated with the pressure sensor. Selecting an individual sensor may bring up further menu options, such as options to obtain a reading for a particular sensor, calibrate the sensor, or other actions. Although shown as having commands or other options for a single controllable element, icons or context menus can be included for groups of controllable elements. For example, all pressure sensing controllable elements for a particular device may be grouped in a single context menu, or all controllable elements for a device grouped regardless of function. Similarly, controllable elements having a common function may be grouped in a common context menu, even if the controllable elements are associated with different devices 614.

Example 8—Example User Interface Generation Methods

Figure 7:
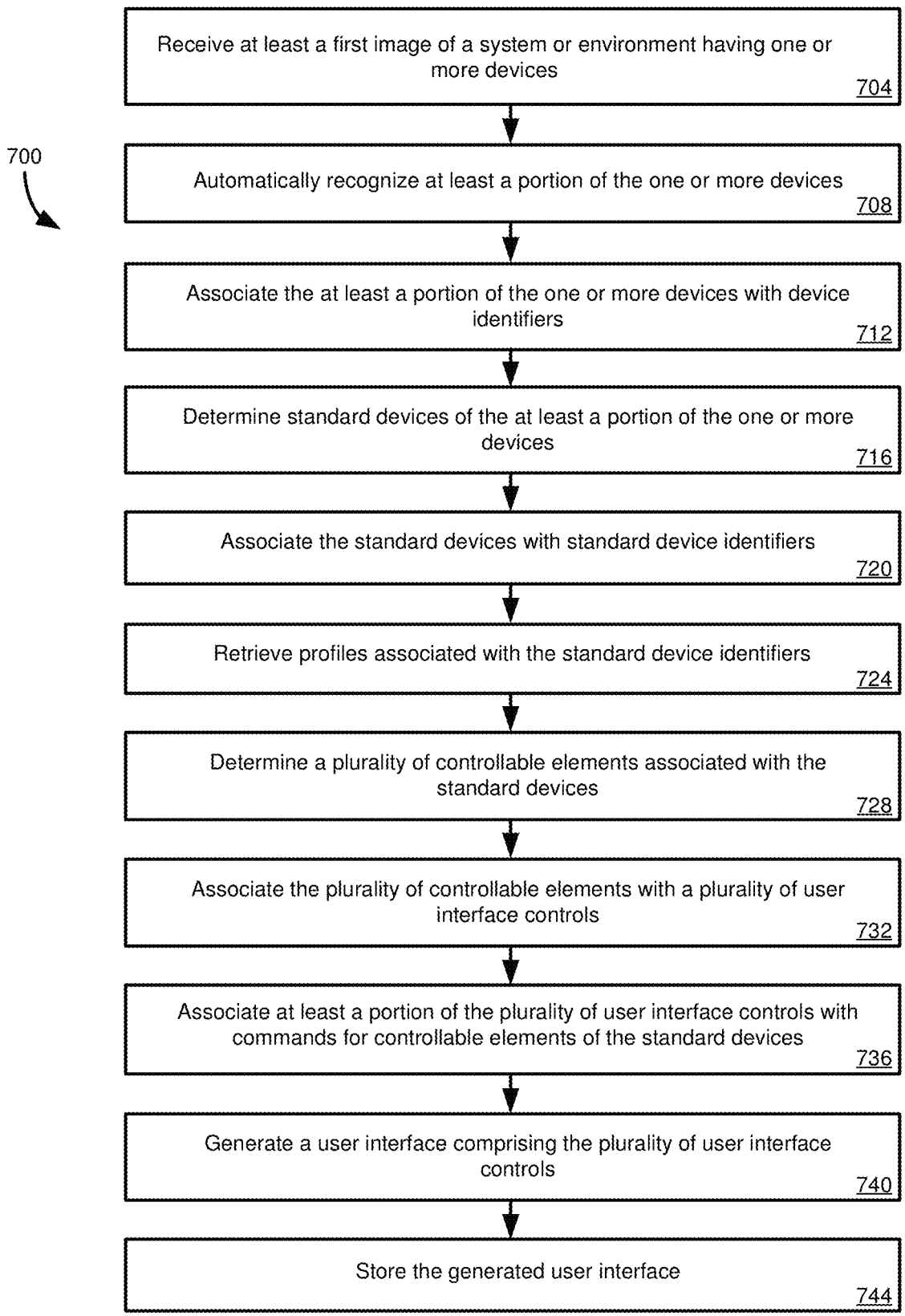

FIG. 7 is a flowchart of an example method 700 of generating a user interface. The method 700 can be performed, in some examples, using the computing environment 200 of FIG. 2. At 704, at least a first image of a system or environment that includes one or more devices is received. A machine learning technique is used, at 708, to automatically recognize at least a portion of the one or more devices in the at least a first image. At 712, at least a portion of the one or more devices are associated with device identifiers, where a device identifier uniquely identifies a device. Standard devices of the at least a portion of the one or more devices are determined at 716. At 720, the standard devices are associated with standard device identifiers (which, for example, identify a particular type of standard device, and the device identifiers can be used, among other things, to distinguish between multiple devices of a standard type that might be present in the system or environment).

Profiles associated with the standard device identifiers are retrieved at 724. At 728, from the profiles, a plurality of controllable elements associated with the standard devices are determined. The plurality of controllable elements are associated with a plurality of user interface controls at 732. At 736, at least a portion of the plurality of user interface controls are associated with commands for respective controllable elements of the respective standard devices. A user interface is generated, at 740, which includes the plurality of user interface controls. The generated user interface is stored at 744.

FIG. 8 is a flowchart of an example method 800 of generating a user interface. The method 800 can be performed, in some examples, using the computing environment 200 of FIG. 2. At 804, indications are received for a plurality of devices, a plurality of controllable elements, or a combination thereof. Based on the indications, one or more commands associated with the plurality of devices, plurality of controllable elements, or combination thereof, are retrieved at 808. The one or more commands are mapped to commands of a standardized command schema. Based on the indications, a plurality of user interface controls are retrieved at 812 from a user interface control library. At least a portion of the user interface controls are usable to receive user input indicating that a command should be sent to a corresponding device or controllable element. At 816, a user interface is generated comprising the plurality of user interface controls. The generated user interface is stored at 820.

FIG. 9 is a flowchart of an example method 900 of generating a user interface. The method 900 can be performed, in some examples, using the computing environment 200 of FIG. 2. At 904, at least a first image of a system that includes a plurality of devices is received. Each device is associated with one or more controllable elements. Using a machine learning classifier, at 908, at least a portion of the plurality of devices are identified. Commands associated with the one or more devices are determined at 912. At 916, the determined commands are associated with controllable elements of the identified at least a portion of the devices. The controllable elements of the identified at least a portion of the devices are associated with respective user interface controls at 920. At 924, a user interface is generated that includes at least a second image of the system, which can be the first image. The user interface has user interface controls displayed on or proximate respective associated devices of the plurality of devices. The user interface controls are selectable to send commands to the associated controllable elements.

Example 9—Computing Systems

Figure 10:
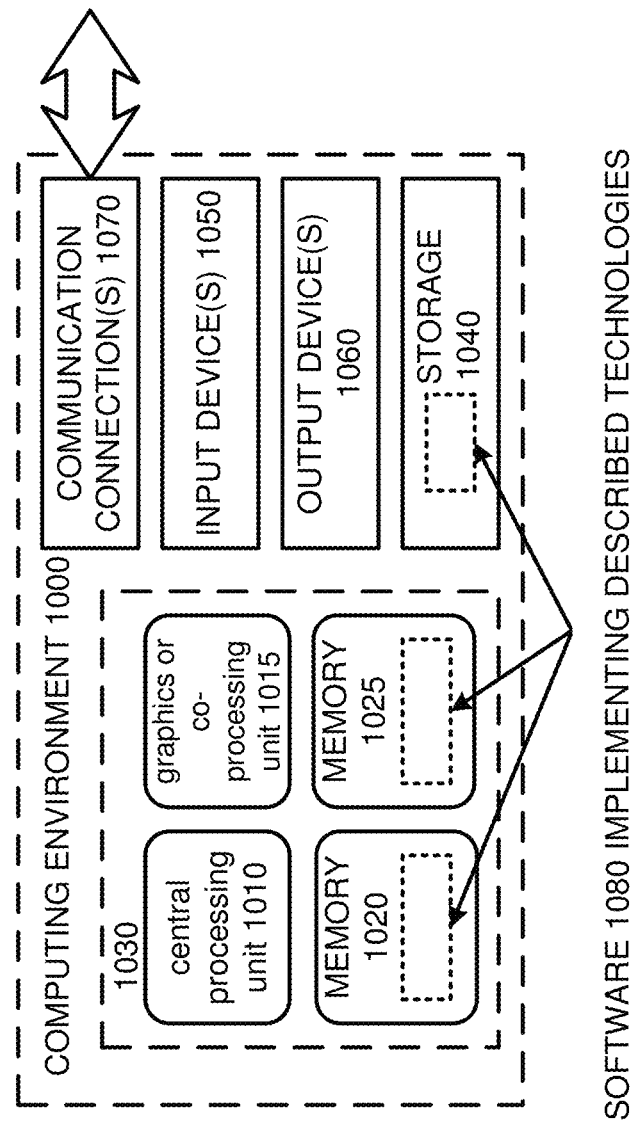
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the computing environment 200 of FIG. 2, including as described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
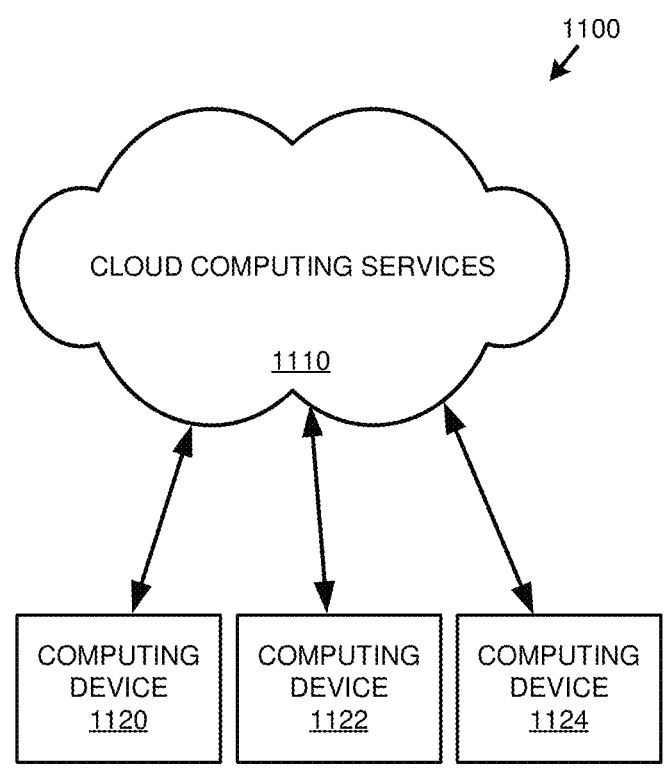
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising one or more processors and one or more memories coupled to the one or more processors, the one or more memories comprising computer-executable instructions for causing the computing system to perform operations comprising:
receiving at least a first image of a system or environment comprising one or more devices;
using a machine learning technique, automatically recognizing at least a portion of the one or more devices in the at least a first image;
associating the at least a portion of the one or more devices with device identifiers, wherein a device identifier uniquely identifies a device;
determining standard devices of the at least a portion of the one or more devices;
associating the standard devices with standard device identifiers;
retrieving profiles associated with the standard device identifiers;
from the profiles, determining a plurality of controllable elements associated with the standard devices;
associating the plurality of controllable elements with a plurality of user interface controls;

associating at least a portion of the plurality of user interface controls with commands for respective controllable elements of respective standard devices;

generating a user interface comprising the plurality of user interface controls; and storing the generated user interface.

2. The method of claim 1, wherein at least one of the at least a portion of the plurality of devices comprises multiple controllable elements of the plurality of controllable elements.

3. The method of claim 1, further comprising rendering a second image depicting at least a portion of the system or environment in the generated user interface.

4. The method of claim 3, wherein the second image is a schematic image of the at least a portion of the system or environment.

5. The method of claim 4, the operations further comprising:

automatically generating the schematic image from the at least a first image.

6. The method of claim 4, wherein the schematic image is a three-dimensional representation of the at least a portion of the system or environment and the automatically generating uses a plurality of images of the system or environment, including the at least a first image.

7. The method of claim 3, wherein generating the user interface comprises displaying the user interface controls on the second image at positions at least generally corresponding to geospatial positions of the corresponding controllable elements in the system or environment.

8. The method of claim 1, the operations further comprising:

rendering the user interface for display to a user;

receiving user input through the user interface selecting a user interface control of the at least a portion of the user interface controls associated with commands for controllable elements;

determining a command associated with the selected user interface control; and sending the command to the controllable element associated with the selected user interface control.

9. The method of claim 8, wherein the user input comprises one or more values for one or more parameters, and the one or more values are sent to the controllable element in response to receiving the user input.

10. The method of claim 1, the operations further comprising:

creating a profile for a standard device or standard controllable element, the profile comprising:
an identifier of the standard device or standard controllable element;
one or more commands associated with one or more controllable elements included in the standard device or associated with the standard controllable element; and
information mapping the one or more commands to one or more standardized commands of a standardized command schema.

11. The method of claim 1, wherein the machine learning technique comprises a neural network.

12. The method of claim 1, the operations further comprising:

receiving user input to create a device profile for a custom device, the device profile comprising:
a customer device identifier uniquely identifying the custom device;
one or more commands that can be issued to the custom device; and
mapping information mapping the one or more commands to commands of a standardized command schema.

13. The method of claim 1, wherein the system or environment is a first system or environment, the generated user interface is a first user interface and comprises at least a first user interface control associated with at least a first command, and the operations further comprise:

generating a second user interface for a second system or environment, different than the first system or environment, wherein the second user interface comprises the at least a first user interface control, the first user interface control being associated with the at least a first command.

14. The method of claim 1, the operations further comprising:

receiving a list of devices, controllable elements, or combination thereof, associated with the system or environment; and providing the list to the machine learning technique, wherein the machine learning technique uses the list to improve the accuracy of the automatically recognizing.

15. The method of claim 1, wherein the controllable elements are associated with a type, and the plurality of controllable elements comprise multiple elements of the same type, the operations further comprising:

assigning unique identifiers to the plurality of controllable elements, such that the controllable elements can be controlled through independent user interface controls.

16. The method of claim 1, wherein the controllable elements are associated with a type, and the plurality of controllable elements comprise multiple elements of the same type, the operations further comprising:

associating the plurality of controllable elements with a common user interface control.

17. The method of claim 16, wherein the common user interface control comprises a context menu.

18. The method of claim 1, the operations further comprising:

rendering the user interface for display to a user;

receiving user input through the user interface selecting a user interface control of the at least a portion of the user interface controls associated with commands for controllable elements;

passing a command associated with the selected user interface to a communication framework, wherein the communication framework communicates with a controllable element to execute at least one operation associated with the passed command.

19. A computing system comprising:

memory;

one or more processing units coupled to the memory; and one or more non-transitory computer readable storage media storing instructions that, when loaded into the memory, cause the one or more processing units to perform operations for:

receiving indications for a plurality of devices, a plurality of controllable elements, or a combination thereof;

based on the indications, retrieving one or more commands associated with the plurality of devices, plurality of controllable elements, or combination thereof, wherein the one or more commands are mapped to commands of a standardized command schema;

based on the indications, retrieving a plurality of user interface controls from a user interface control library, at least a portion of the user interface controls useable to receive user input indicating that a command should be sent to a corresponding device or controllable element;

generating a user interface comprising the plurality of user interface controls; and saving the generated user interface.

20. One or more non-transitory computer-readable storage media storing computer-executable instructions for causing a computing system to perform processing for a method comprising:

receiving at least a first image of a system comprising a plurality of devices, each device associated with one or more controllable elements;

using a machine learning classifier, identifying at least a portion of the plurality of devices;

determining commands associated with identified at least a portion of the plurality of devices;

associating the determined commands with controllable elements of the identified at least a portion of the plurality of devices;

associating the controllable elements of the identified at least a portion of the plurality of devices with respective user interface controls; and generating a user interface comprising at least a second image of the system, which can be the at least a first image, and having user interface controls displayed on or proximate respective associated devices of the identified at least a portion of the plurality of devices, wherein the user interface controls are selectable to send commands to the associated controllable elements.

* * * * *